April 14, 1964  H. G. BRADSHAW ETAL  3,128,485
APPARATUS FOR THE FIELD CLEANING OF VEGETABLES
Filed March 30, 1960  4 Sheets-Sheet 2
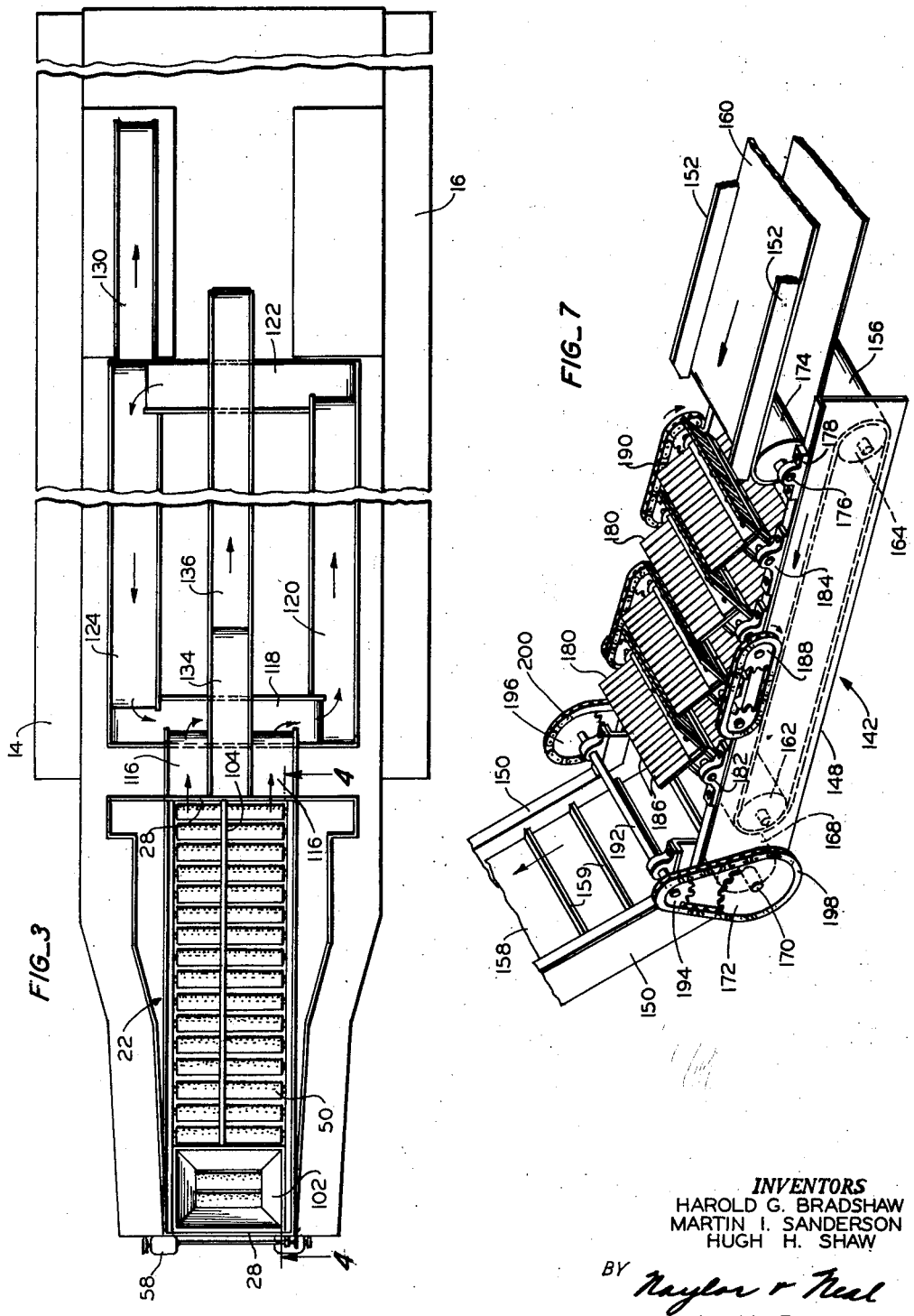
INVENTORS
HAROLD G. BRADSHAW
MARTIN I. SANDERSON
HUGH H. SHAW
BY Naylor & Neal
ATTORNEYS

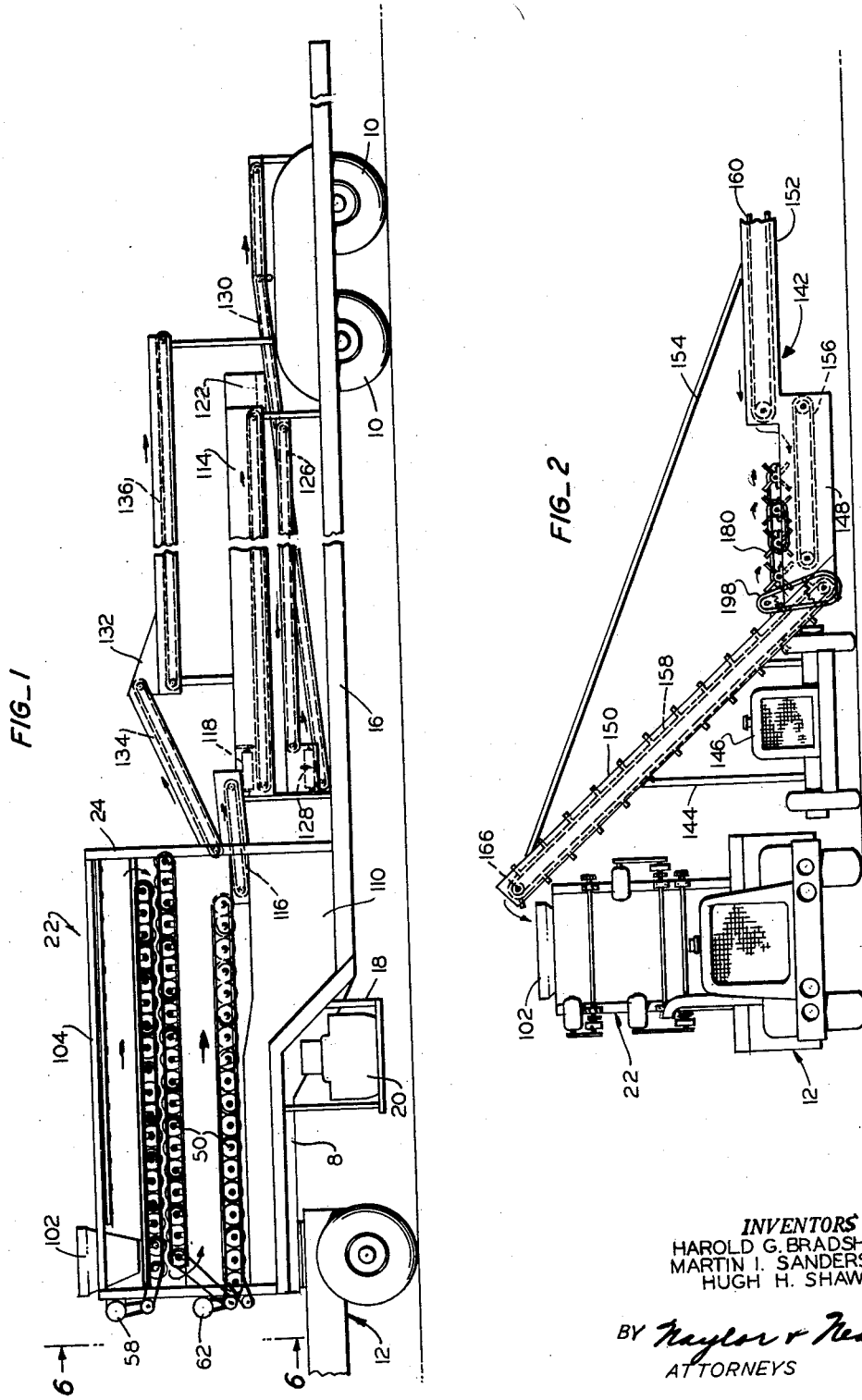

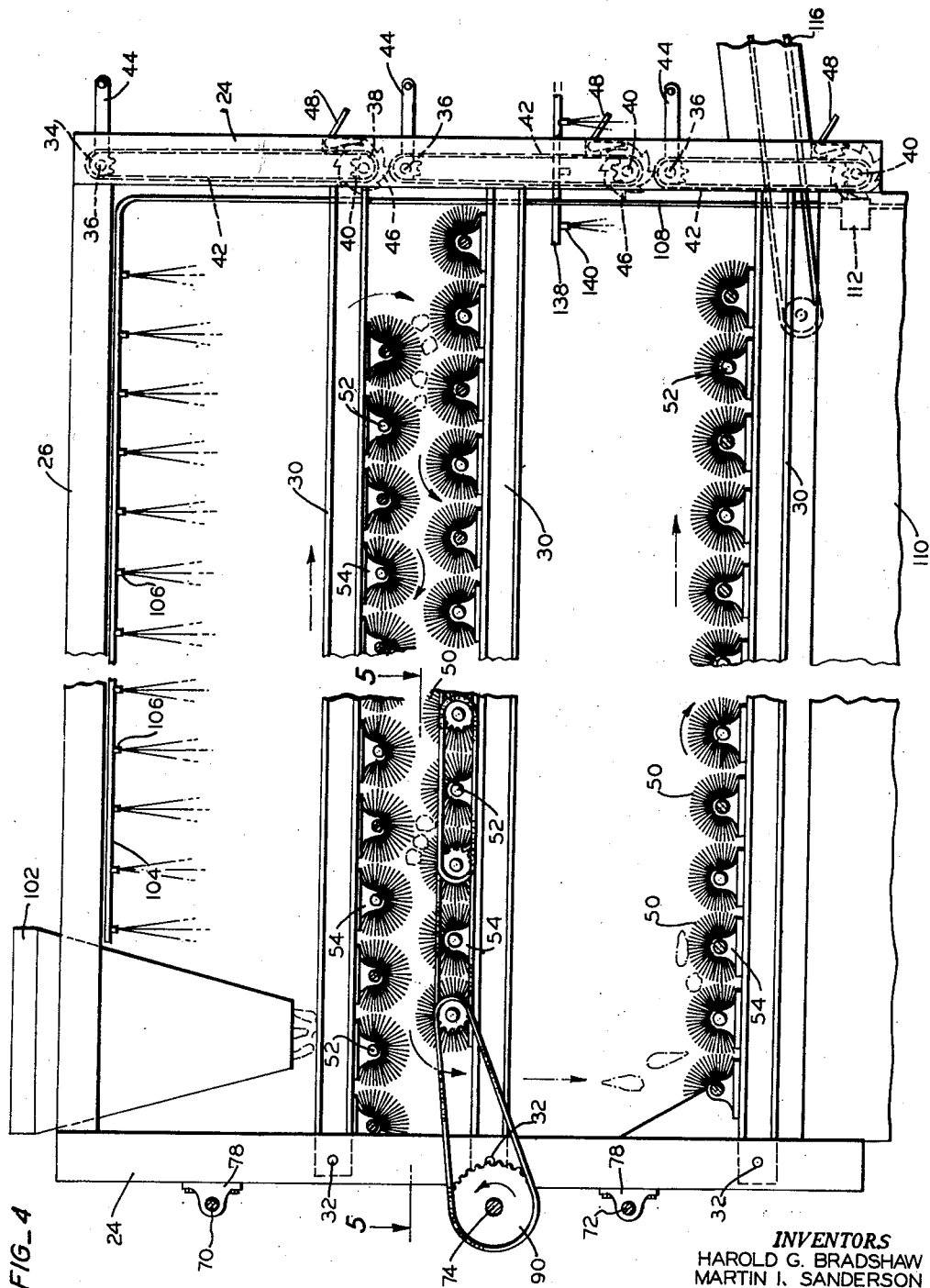

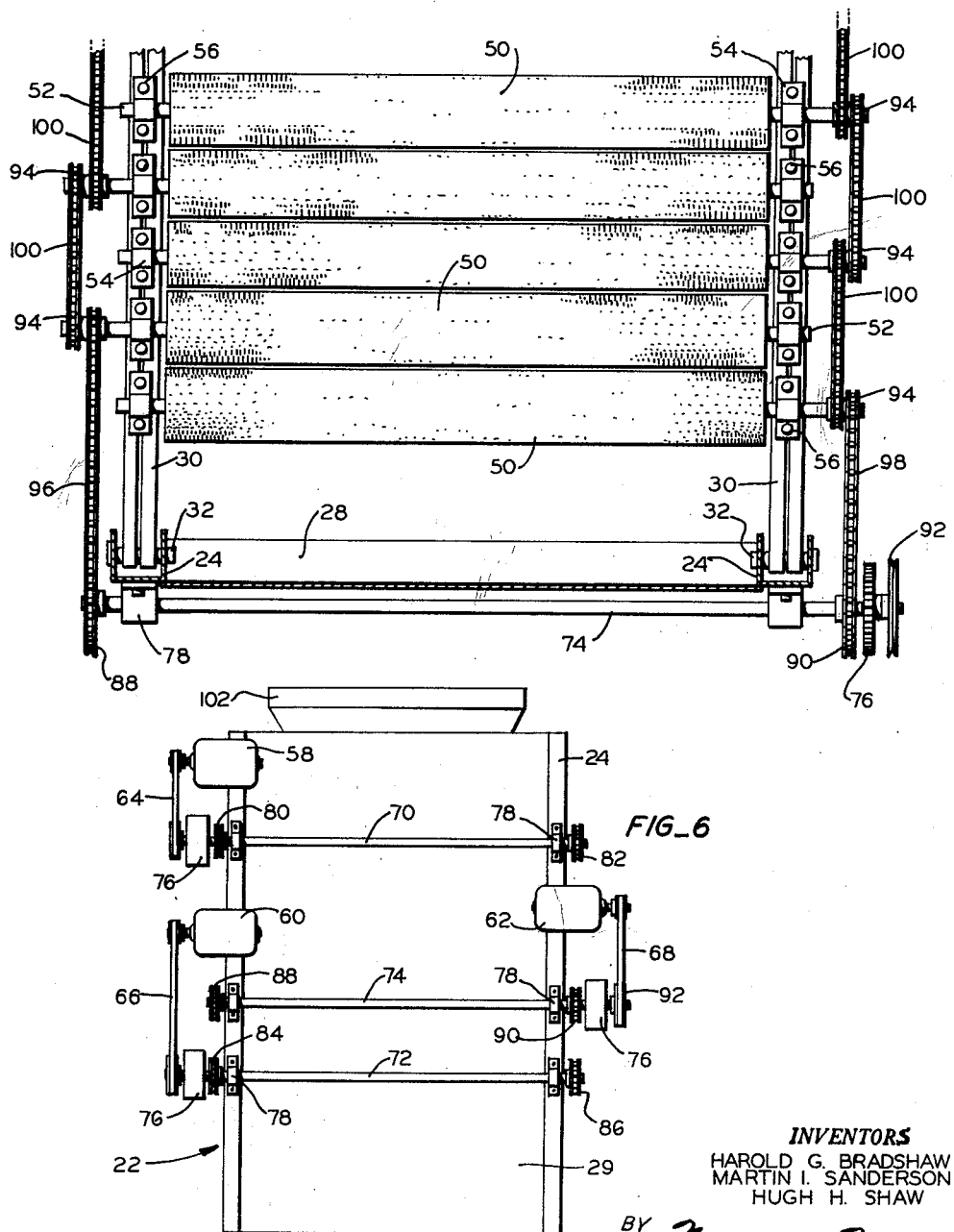

3,128,485
APPARATUS FOR THE FIELD CLEANING
OF VEGETABLES
Harold G. Bradshaw, Martin I. Sanderson, and Hugh H. Shaw, Salinas, Calif., assignors to Cochran Equipment Company, Salinas, Calif., a corporation of California
Filed Mar. 30, 1960, Ser. No. 18,708
13 Claims. (Cl. 15—3.14)

This invention relates to an apparatus for the cleaning of vegetables, which is particularly well adapted for the field processing of carrots.

It is an object of this invention to provide an apparatus for the cleaning of vegetable produce, which is adapted for use in the field to permit processing of the produce immediately after picking.

It is another object of this invention to provide an apparatus capable of thoroughly cleaning and processing vegetable produce in the field such that the produce is in suitable condition for immediate packaging and retail sale without the necessity of further processing.

Yet another object of this invention is to provide an apparatus of the character described, which may be varied in operation to suit the more or less dirty condition of the produce after picking.

A further object of the invention is to provide an apparatus of the character described, which is particularly suitable for the processing of carrots and the removal of root whiskers and dirt therefrom.

Still further objects and advantages of this invention will become apparent from the following description, when taken in conjunction with the drawings in which;

FIGURE 1 is a view in side elevation of a portion of the apparatus, with the washing means at the left and the bagging and boxing area at the right;

FIGURE 2 is a view in front end elevation illustrating the side delivery conveyor in operating position for hopper delivery of produce to the washing means;

FIGURE 3 is a view in plan of that portion of the apparatus shown in FIGURE 1, with the arrows indicating the path of produce flow in the bagging and boxing areas;

FIGURE 4 is a view in side elevation illustrating interior details of the washing means;

FIGURE 5 is a view in horizontal section taken on the line 5—5 of FIGURE 4, illustrating the means typically employed for mounting and driving the rotary brushes of the washing means;

FIGURE 6 is a view in front-end elevation taken on the line 6—6 of FIGURE 1, illustrating the means utilized in driving the brushes of the washing means in rotation; and FIGURE 7 is an enlarged fragmentary view in perspective of the chicken picker or dry cleaning portion of the apparatus.

Referring now to the drawings, in FIGURE 1 there is shown a chassis 8 supported at its rearward end for field travel upon wheels 10 and swivably supported at its front end for propulsion by means of a tractor unit, generally designated 12. A deck is provided to extend over the chassis and includes horizontal longitudinally extending side or outrigger members 14 and 16 (see FIGURE 3) for crew support. Depending from either side of the front portion of the chassis 8 are frames 18—18 upon each of which are carried electric generator plants 20—20. These plants furnish electric power for the motors, hereinafter described, which drive the various conveyors and brushes mounted on chassis 8.

In FIGURES 1, 3, and 4 the washing means, generally designated 22, is shown mounted on the forward portion of the chassis, being carried upon a structural framework which includes four upright channel support members 24, and extending therebetween as structural ties, a pair of horizontal longitudinal members 26 and a pair of horizontal transverse members 28. The forward and rearward ends of this framework are closed by vertically extending plates 29—29. In FIGURES 4 and 5 are illustrated the pivotally mounted frames upon which the rotary brushes of the washing means are carried. Each of such frames is similarly constructed to include a pair of spaced apart parallel side rails 30 pivoted, as by means of pins 32, at their forward ends to the forward pair of upright framework members 24. It will be noted that the intermediate and uppermost pairs of rails are spaced closer together than the intermediate and lowermost pairs of rails to permit mounting of those rotary brushes of the washing means positioned in the upper tier, closely adjacent those of the intermediate tier for a compression scrubbing pass of the produce. For reasons presently explained, the side rails consist of pairs of rather closely spaced apart parallel channel members disposed with their web portions back to back.

Means are provided for individually and movably supporting the respective pairs of rails at their rearward ends. Such means are similar and, as shown in FIGURE 4, include pairs of manually driven top sprockets 34—34 carried at the ends of shafts 36 and lower idler sprockets 38—38 carried upon the ends of similarly journaled shaft 40. Entrained about each of the sprocket sets 34 and 38 are endless chains 42, which latter are fixedly secured to the rearward ends of associated frame side rails 30, thereby to furnish the above indicated movable support for same. Fixedly secured to each of the upper shafts 36, are manually operated crank handles 44 by means of which chain rotation and raising or lowering of the attached side rails 30 may be effected from locations exteriorly of the washing means. To permit fixing of the side rails after the positioning of their rearward ends, there are provided pairs of ratchets 46—46 carried upon idler shafts 40 adjacent sprockets 38. Detent means 48—48, which are pivoted to rearward framework members 24 for engagement with the ratchet teeth to prevent counter-clockwise ratchet movement, secure the chains 42 against movement under the weight of the side rails 30, for which latter they provide the sole rearward end support. As shown in FIGURE 4, the detents are in various positions of pivot with their actuating manually-operable handles extending obliquely to the rear. It is preferable that each pair of detent means which is arranged for engagement with the ratchets of a particular shaft, be tied together, as by a horizontally extending actuating bar (not shown), in order that each of the pairs of detents may be synchronously operated. From the above description, it will be apparent that the rearward ends of each pair of framework side rails 30 are adjustable to a particular elevation thereby to effect an inclination in or a horizontal positioning of said side rails and that once adjusted, the position of same may be conveniently fixed by the ratchet and detent means from a location outside of the washer means.

In FIGURES 4 and 5, there are shown mounted upon and extending transversely of each of the pairs of side rails 30—30 a plurality of brushes 50 rotatably disposed in parallel relation and spaced slightly apart. The brushes are similar in construction, being of generally cylindrical shape with bristles radiating from their cores. Preferably the brush bristles are of a strong, durable material and in in practice nylon has been found very satisfactory for the purpose. Each of the brushes is similarly mounted for rotation upon its associated side rails and is carried upon a shaft 52 journaled for rotation at either end in bearing block members 54. In FIGURE 4, it may be seen that although the brushes are essentially similar in their means of mounting upon side rails 30, i.e., through shafts 52 and blocks 54, the latter in the upper tier of brushes are secured in depending relation from the uppermost pair of side rails. This permits a relatively close spacing between the two upper tiers of brushes for effecting the prior mentioned compressive run of the produce on its second pass, right to left, through the washing means. In FIGURE 5 is shown the means for mounting the individual bearing members 54 upon the side rails 30. As will be noted, retaining fasteners 56, here assumed for illustration purposes to be bolts retained at their lower ends by means of threaded members (not shown), secure members 54 to the side rails 30 and extend intermediate the spaced apart channel members making up such rails. This arrangement conveniently permits movement of the brushes longitudinally of the washing means to effect any particular brush spacing desired.

To permit of continuous movement of the produce through the washing means in the directions indicated in FIGURE 4, a space or gap is provided at the rearward end of the uppermost tier of brushes through which the produce may fall onto the intermediate or second brush tier. Due to the convenient means for mounting the brushes, above described, removal of one or more of the upper tier brushes adjacent such gap is easily effected and may be desirable where a reduced exposure of the produce to brush action is required. The intermediate brush tier, like the uppermost one, is provided with an end gap, but at its forward end. Such gap permits passage of the produce from the intermediate brush tier and droppage onto the lowermost and continuous tier of brushes, ultimately for passage rearwardly therefrom out of the washing means and into the bagging area to the right of FIGURE 4.

Mounted upon the forward end of the washing means framework structure are motors 58, 60, and 62, preferably of variable speed type, energized from the electric power plates 20 and respectively driving the brushes 50 through pulley and belt linkages 64, 66, and 68, and countershafts 70, 72, and 74, said countershafts each being journaled in bearing members 76 and 78 and carrying at their ends pairs of take-off sprockets 80 and 82, 84 and 86, and 88 and 90. For reasons presently to be explained, the sprockets of each pair are preferably of different sizes. Inasmuch as the driving means for the top and bottom tiers are essentially similar to that for the intermediate tier, which latter is illustrated in detail in FIGURES 5 and 6, the description herein will be limited to the driving means for said intermediate tier. In FIGURE 5 the right hand end of countershaft 74 is shown extended through bearing member 76 to carry thereat a sheave 92 for receipt of the belt 68, driven in rotation by motor 62. Each of the shafts 52, upon which brushes 50 are carried, is extended at one end, the shafts of adjacent brushes being extended to carry pairs of similar sprockets 94. The two brushes 50 nearest countershaft 74 are driven in rotation thereby through take-off sprockets 88 and 90 and endless chains 96 and 98 entrained about said sprockets and the sprockets 94 of each of said two brushes. The remaining brushes of the tier are driven in alternate pairs from these two brushes by means of endless chains 100 entrained about brush sprockets 94, with odd numbered brushes being driven from the right hand end of the tier and sprocket 90, and even numbered brushes from the left hand end of the tier and sprocket 88. The size of the take-off sprockets 88 and 90 thus govern the speed of rotation of the respective sets of alternate brushes to which they are linked and provide an easy means of establishing a speed differential between said sets.

Mounted atop the forward end of the washing means between framework members 26 is a tapered bottom hopper 102, the lower or discharge end of which is positioned above the forward brushes of the uppermost brush tier.

Spray means are provided for cleansing the produce and include a header 104 carried upon the washer means support framework to extend longitudinally and generally centrally of same above the top tier of rotary brushes 50.

Communicating with header 104 are a plurality of spray nozzles 106 directed downwardly to discharge a spray over a substantial portion of the surface of the uppermost tier of brushes. A riser 108 feeds header 104 from sump 110 thereby to provide for the recirculation of washing fluid, which is effected by means of a pump 112. Side plates (not shown) for preventing the loss of washing fluid are preferably installed to extend the length of either side of the washing means support framework above the uppermost tier of brushes and between the intermediate and lowermost brush tiers. Such plates may conveniently be installed in the manner of similar plates which define the sump 110 (FIGURE 1).

In FIGURES 1 and 3 are shown carried upon the framework 114 to extend rearwardly of the washer means, conveyor means for transporting produce to the bagging and boxing areas. Included in the conveyor means and moving in the directions indicated, are a pair of parallel endless conveyors 116 disposed in side by side relation with their forward ends partially underlying the rearmost brush of the lowermost tier of brushes 50 and their forward ends overlying a transversely disposed endless conveyor 118. Conveyor 118 constitutes the forward portion of a stepped, closed conveyor circuit comprising a longitudinally extending endless conveyor 120, which at its forward end underlies the discharge end of conveyor 118 and at its rearward end overlies transverse conveyor 122. Transverse conveyor 122 is disposed in parallel relation with conveyor 118 being positioned with its discharge end overlying the rearward end of longitdinally extending endless conveyor 124, which latter is in paralllel relation with conveyor 120. Conveyor 124 completes the circuit with its forward end disposed above one end of conveyor 118. Disposed beneath the above-described conveyor circuit, is a packaged produce conveyor of box-U shape comprising longitudinal endless conveyor 126 discharging rearwardly onto endless transversely extending conveyor 128, the latter discharging onto the longitudinal inclined endless conveyor 130. A segregated produce conveyor completes the conveyor means, being carried upon elevated support framework 132 and being comprised of a pair of longitudinally extending centrally disposed conveyors 134 and 136.

For produce cleaning there are provided in addition to the aforementioned spray means, rinsing means which extend above conveyors 116 to discharge fluid thereover and which includes a header 138 and downwardly directed spray nozzles 140. Header 138 communicates with a pressure source of liquid, usually water (not shown).

In FIGURE 2 is illustrated the side delivery conveyor means, generally designated 142, carried upon upright structural members 144 mounted upon a powered vehicle 146 for field movement. Side delivery conveyor means 142 includes a support structure comprised of a pair of spaced apart parallel side plates 148 having outturned flanges at their upper ends and extending centrally and longitudinally of the conveyor means 142. A pair of similarly flanged side plates 150 are aligned with side plates 148, being secured thereto at their lower ends and intermediate their lengths being carried atop upright members 144 to extend diagonally upward from the inner or left ends of the side plates 148 as viewed in FIGURE 2. Generally horizontal side plates 152 are aligned with and secured to the outer or right ends of side plates 148. A pair of tension struts or trussing members 154 extend diagonally intermediate side plates 150 and 152 to provide structural reinforcement. As shown in FIGURE 2, such struts are fixedly secured at either end to the respective side plates 150 and 152, as by welding. This is compatible with the fixed joinder of such side plates with centrally disposed side plates 148. However, it may be desirable, particularly where operation of the apparatus is to be carried on over terrain of an irregular or non-flat character, to provide for flexible joinder between side plates 148 and side plates 150 and to pivotally secure the upper or lower ends of struts 154 either to side plates 150 or 152 and to secure the struts at their other or unsecured ends for adjustable movement relative to the other of said side plates. Adjustment of the angularity between inside plates 150 rigidly affixed to the vehicle-clined side plates 150 rigidly affixed to the vehicle-mounted structural uprights 144 and the generally horizontal plates 148 and 152 may then be achieved to accommodate undulating terrain.

Mounted upon the above conveyor means support structure in alignment with one another, are a plurality of endless conveyors 156, 158 and 160. These conveyors are driven in the directions indicated in FIGURES 2 and 7 from a power source (not shown). The intermediate conveyor 156 is carried between side plates 148, being rotatably supported at either end upon rollers 162 and 164. Inclined endless conveyor 158 is carried between side plates 150 and is rotatably supported at its upper end upon roller 166 and at its lower end upon roller 168, the latter carried upon shaft 170 to which is secured sprocket 172, FIGURE 7. As indicated in FIGURE 2, the lower or pick-up end of conveyor 158 is disposed slightly below the discharge or inner end of conveyor 156 for produce pick-up therefrom. The generally horizontal conveyor 160 is carried at its discharge end upon a roller 174, the shaft 176 of which is journaled at either end for rotation in bearing blocks 178 carried atop the outturned flanges of side plates 148. The inner end of conveyor 160 is thus disposed in overlapping relation with the outer end of conveyor 156.

In FIGURE 7 are illustrated the details of the produce dry cleaning or "chicken picker" means, including beater means employing a plurality of similar beaters 180 carried upon shafts 182 to extend transversely of conveyor 156, each beater being journaled for rotation at either end in a bearing block 184 which is mounted atop the outturned flanges of side plates 148. A plurality of elongated fingers 186 radiate from the cores of the beaters, being individually mounted for independent flexure. Such fingers are of sufficient length such that when the beaters are driven in rotation, the finger outer tips move closely adjacent or into actual contact with the upper reach of underlying conveyor 150, as generally indicated in FIGURE 2.

Although a variety of means may be utilized for driving beaters 180 in rotation in the directions indicated in FIGURES 2 and 7, the proximity and alignment of the various portions of the side delivery conveyor means makes interconnection of the beaters and the conveyors 156, 158 and 160 desirable in order that rotation thereof may be effected from a single power source (not shown). As shown in FIGURE 7, such arrangement may include beater driving means comprised of sprockets 188 secured to shafts 182 and having endless chains 190 entrained thereabout. Conveyors 156, 158 and 160 may be driven through any suitable mechanical linkage which, as illustrated, may include a driven shaft 192 at the end of which are secured sprockets 194 and 196. Endless chain 198, as illustrated, is entrained about sprockets 172 and 194 and serves thereby to tie conveyor 158 to conveyors 156 and 160, only endless chain 200 of the actual linkage to the latter two conveyors being indicated. But such connection may, of course, be achieved in any conventional fashion, as by chain and sprocket linkages, compatible with effecting rotation of the conveyors and beaters in the directions indicated.

Operation of the apparatus will be described in relation to the handling of carrots, for which it is particularly well suited. Vehicle 146 is initially positioned, as in FIGURE 2, alongside vehicle 12 and the washer means 22, with the upper or discharge end of inclined ladder conveyor 158 positioned above the open upper end of hopper 102. The vehicles are then driven through the field while the crop is picked, being maintained in this side by side relation.

As the carrots are harvested, they are placed upon conveyor 160, usually by pickers who precede the machine through the field, and are suitably topped prior to reaching the discharge or inner end of conveyor 160. Upon reaching said discharge end, the carrots, although in topped condition, still possess their root whiskers and a good deal of surface dirt, the amount of which will of course depend upon picking conditions.

From conveyor 160, the carrots discharge onto conveyor 156 to move inwardly and successively beneath the various beaters 180. These beaters are driven in rotation so that the fingers 186 thereof move in the same direction as the upper carrot-carrying reach of conveyor 156, both the fingers 186 and the conveyor 156 thereby urging the carrots in their continuous inwardly directed path of travel toward the washer means 22. As the carrots move beneath beaters 180 their surfaces are subjected to the abrading action of the serrated surfaces of fingers 186, which action is increased as the result of the abrasive effect of dirt picked up and carried upon the finger surfaces. The beaters thus serve to subject the carrots to a dry cleaning action by rubbing off considerable surface dirt while at the same time removing the carrot root whiskers. By utilizing a plurality of beaters beneath which the carrots successively pass and a plurality of flexible fingers 186 in each beater, a thorough dry-action surface scrubbing of each of the carrots is substantially assured.

From the dry cleaning means and its beaters, the dewhiskered carrots, carried by conveyor 156, discharge onto the lower end of ladder conveyor 158 which, through transversely disposed outstanding pusher plates 159, carries them upwardly for deposition in hopper 102. As the carrots drop through hopper 102, they are directed onto the forward end of the uppermost tier of rotary brushes 50 of washer means 22. By virtue of the forward end location of the hopper, each of the carrots is subjected to passage over substantially the entire run of the uppermost brush tier, i.e., from the forward to the rearward end of the washer means, during which it is not only surface brushed and scrubbed by brushes 50, but is also subjected to a cleansing spray, here assumed for illustration to be water, emitted from overhead nozzles 106. As previously indicated, the adjacent brushes of each of the brush tiers rotate in the same direction but at different speeds. Therefore, as the carrots move from one to the other of these adjacently disposed brushes, they are agitated to tumble and expose their entire surfaces to the action of the brushes.

The rate of carrot flow over the brush tiers and their consequent extent of exposure to brush action may be changed to accommodate the more or less dirty condition of the carrots. This is accomplished by individually and selectively pivoting one or more of the brush tiers by means of manually operable handles 44 either into horizontal positions or into positions inclined either upwardly or downwardly relative to the direction of carrot flow over the particular brush tiers involved. The tiers may then be fixed in position by means of coacting ratchets 46 and detents 48. The extent of the brushing action may further be varied in the upper and intermediate brush tiers by shortening the length of their respective runs by removing one or more of the brushes adjacent the end gaps provided as pass throughs for the carrots.

The cleansing action of the spray is particularly effective in conjunction with the abrasive action of the rotating brushes 50 by virtue of provision for recirculation of the wash water and the soil particles suspended therein. The water after spraying onto the top brush tier is retained in the washing means through use of plates (not shown) and the end plates 29, being thereby caused to flow downwardly over the remaining brush tiers and thence into the sump 110 from which pump 112 returns it for respraying from nozzles 106. As indicated above, the suspended soil particles thereby picked up aid considerably in the scrubbing action of the brushes.

When the carrots reach the rearward end of the top tier of brushes, they drop onto the intermediate tier for a forwardly directed compression pass during which the carrots are subjected to the combined action of the closely spaced rotating brushes 50 of both the top and intermediate tiers, as well as to the enhanced abrasive action resulting from recirculation of the rinse water. After subjection to the compression pass during which the carrots are tumbled and agitated as a result of the speed differential between adjacent brushes to thoroughly expose their entire surfaces to brush action, the carrots emerge from the forward end of the intermediate brush tier to drop onto the bottom tier for a rearwardly directed pass, during which the action described in connection with the pass of the carrots over the top tier is repeated. As the carrots discharge rearwardly from the lower brush tier, they drop onto the rearwardly moving upper reach of conveyor 116 at which time they are subjected to a fresh water rinse emitted from nozzles 140, which rinse serves to remove any fine soil particles which may still remain upon the surfaces of the carrots by virtue of their treatment with the recirculated cleansing water. After this rinse, the carrots are in very clean condition ready for immediate packing and retail sale to the consumer.

Conveyor 116 carries the rinsed carrots rearwardly where they are discharged onto laterally moving conveyor 118 and thence onto conveyor 120 which carries the carrots rearwardly to packers positioned at stations upon side member 16 who package the carrots in polyethylene bags or the like. The bagged carrots are then manually deposited upon the underlying conveyor 126 which carries them forwardly for deposition upon laterally moving conveyor 128 for ultimate deposition upon inclined conveyor 130, which latter moves the carrots to the rear part of the apparatus for boxing. Those carrots not initially removed by the packers from conveyor 120, are discharged onto laterally moving conveyor 122 and thence to forwardly moving conveyor 124, from which the carrots are then removed by other packers positioned upon the opposite side member 14, and thereupon packaged and deposited upon the underlying conveyor 130 for carriage to the rear boxing area. Such carrots as remain unbagged, move to conveyor 118 for repetition of the closed circuit bagging run.

The center conveyor 136 is provided for segregation of the large or jumbo carrots during grading, which are manually placed thereon and carried immediately to the rear of the apparatus for boxing, by-passing the bagging run.

It will be appreciated that the embodiment of the invention as herein described may be altered, changed, or modified without departing from the spirit or scope of the invention as herein claimed.

What is claimed is:

1. A field processing apparatus for vegetables comprising, in combination, a vehicle supported framework; conveyor means for vegetables mounted upon said framework; beater means disposed adjacent the conveyor means for subjecting vegetables carried thereon to a mild surface beating to remove their surface soil; a wheel-supported chassis with a support framework mounted thereon; means mounted upon said support framework for receiving vegetables from said conveyor means for washing, after said beating, including a plurality of parallel rotary brushes arranged in superposed tiers at least two of said tiers being closely spaced apart to compress the vegetables when passed therebetween for scrubbing, spray means for dispersing a washing liquid over the rotary brushes and for capture and recirculation of said liquid over the brushes together with soil particles suspended therein washed from the vegetables, means for driving the brushes of each of said tiers in rotation, such that each of the brushes in a particular tier is driven in the same direction to propel vegetables thereover while at the same time effecting vegetable scrubbing but such that the adjacent brushes of any one tier are driven at different speeds thereby to tumble the vegetables and greater expose their surfaces to brush action, the direction of rotation of the brushes of any particular tier being opposite to that of immediately adjacent tiers to cause the vegetables to traverse a continuous path of travel back and forth through the washing means; and means for applying a clear washing liquid rinse to the vegetables after passage through the washing means preparatory to packaging.

2. The vegetable processing apparatus of claim 1, wherein each of said brush tiers is pivotally mounted upon said support framework for independent movement, and actuating means are operatively connected thereto for individually and selectively effecting the pivotal movement of each of said tiers, thereby to determine their inclination and the rate of flow of vegetables thereover.

3. The vegetable processing apparatus of claim 2, wherein end support and pivotal movement of the brush tiers is effected by means of driven endless flexible members, each formed in two opposing runs by entrainment about pairs of vertically spaced apart members and each having one of its runs connected to a brush tier, and wherein means are provided to fix said tiers in any selected position.

4. The vegetable processing apparatus of claim 3, wherein said endless flexible members comprise chains and said spaced apart members comprise sprockets, with manually operable crank means provided for driving said chains and sprockets in rotation, and wherein said tier fixing means includes individual ratchet and detent means for each tier.

5. The vegetable processing apparatus of claim 1, wherein each of the brushes is carried upon a shaft, opposite ends of the shafts of adjacent brushes having pairs of sprockets secured thereto with endless chains entrained about corresponding sprockets of alternate brushes, and wherein rotation of the brushes in each tier is effected through a countershaft rotatably mounted to extend transversely of the washing means and at either end through sprocket and endless chain linkages driving the linked sets of alternate brushes.

6. The vegetable processing apparatus of claim 5, wherein said tiers are pivotally supported for independent unit movement and means are provided for effecting pivotal movement of same thereby to determine the attitude of said tiers and the rate of flow of vegetables thereover.

7. A field processing apparatus for vegetables comprising, in combination, conveyor means for conveying vegetables in the relatively dry condition in which they come from the ground; beater means for subjecting vegetables carried by said conveyor means to a mild beating action to remove clods of soil therefrom: means for washing vegetables, after said beating, delivered thereto by said conveyor means and including a plurality of parallel rotatable brushes arranged in superposed tiers, spray means for dispersing a washing liquid over the brushes and for the capture and recirculation of same together with suspended soil particles washed from the vegetables, means for driving said brushes in rotation such that the brushes in any one tier rotate in the same direction and the adjacent peripheries of the brushes in adjacent tiers moving in the same direction and defining a scrubbing path therebetween to propel the vegetables along said scrubbing path while at the same time effecting their scrubbing with soil particles suspended in said washing liquid, and means for applying a clear liquid rinse to the vegetables after washing and adding said rinse to said washing liquid.

8. The combination of claim 7, wherein said beater means includes a plurality of parallel beaters disposed for rotation closely adjacent said conveyor means with their axes of rotation extending transversely thereof, said beaters each being provided with a plurality of radially extending flexible fingers for beating contact with vegetables carried upon said conveyor.

9. The combination of claim 8, wherein at least two of the brush tiers of the washing means are closely spaced apart to compress vegetables passed therebetween for scrubbing and wherein means are provided for individually and selectively adjusting the inclination of each of the brush tiers to determine the rate of vegetable flow thereover.

10. The combination of claim 9, wherein said driving means includes means for driving adjacent brushes in each tier at different speeds of rotation thereby to effect the tumbling of vegetables passed thereover to increase the surface exposure of said vegetables to the action of the brushes.

11. In a field processing apparatus for vegetables, means for washing vegetables comprising, in combination, a plurality of parallel rotary brushes arranged in superposed tiers, at least two of said tiers being closely spaced apart to compress vegetables passed therebetween for scrubbing; spray means for dispersing a washing liquid over the rotary brushes and for capture and recirculation of same over the brushes together with suspended soil particles washed from the vegetables; means for driving said brushes in rotation, each of the brushes in a particular tier being driven in the same direction to propel vegetables thereover while at the same time effecting their scrubbing, adjacent brushes being driven at different speeds thereby to tumble the vegetables and greater expose their surfaces to brush action, the direction of rotation of the brushes of any particular tier being opposite to that of the immediately adjacent tiers to cause the vegetables to traverse a continuous path of travel back and forth through the washing means.

12. The vegetable washing means of claim 11, wherein each of said brush tiers is adapted for independent pivotal movement, and actuating means are operatively connected thereto for individually and selectively effecting said movement, thereby to determine the inclination of the tiers and the rate of flow of vegetables thereover.

13. A field processing apparatus for vegetables comprising, in combination, means for subjecting vegetables to a mild surface beating to remove surface soil therefrom; and means for then scrubbing the vegetables including a plurality of rotary brushes arranged in superposed tiers, at least two of said tiers being closely spaced apart to compress said vegetables passed therebetween for scrubbing, spray means including nozzles positioned above the uppermost tier of brushes for emitting a washing liquid thereover and for recovering said liquid together with suspended soil particles washed from said vegetables and recirculating and again spraying same over said uppermost tier, and means for driving the brushes in rotation such that each of the brushes in a particular tier rotates in the same direction, but with adjacent brushes of any one tier rotating at different speeds to tumble the vegetables and greater expose their surfaces to the action of the brushes, the brushes of adjacent tiers rotating in opposite directions to propel the vegetables in continuous flow from one tier to the next underlying tier.

References Cited in the file of this patent

UNITED STATES PATENTS

| | | |
|---|---|---|
| 830,362 | Pennick | Sept. 4, 1906 |
| 1,780,924 | Ingraham | Nov. 11, 1930 |
| 1,982,944 | Anderson | Dec. 4, 1934 |
| 2,057,982 | Secondo | Oct. 20, 1936 |
| 2,073,837 | Ghent | Mar. 16, 1937 |
| 2,149,443 | Kennedy et al. | Mar. 7, 1939 |
| 2,233,611 | Hollenbeck | Mar. 4, 1941 |
| 2,287,447 | Peeples | June 23, 1942 |
| 2,539,470 | Pryor | Jan. 30, 1951 |
| 2,604,646 | Lockwood | July 29, 1952 |
| 2,633,685 | Edwards | Apr. 7, 1953 |
| 2,719,993 | Salkin | Oct. 11, 1955 |
| 2,778,042 | Hession | Jan. 22, 1957 |
| 2,846,704 | Bella | Aug. 12, 1958 |

FOREIGN PATENTS

| | | |
|---|---|---|
| 276,941 | Switzerland | Nov. 1, 1951 |